(12) United States Patent
Bansal et al.

(10) Patent No.: US 9,398,402 B2
(45) Date of Patent: Jul. 19, 2016

(54) TRACKING LARGE NUMBERS OF WIRELESS TERMINALS

(75) Inventors: Ankit Bansal, Uttar Pradesh (IN); Tarun Kumar Bhattacharya, San Jose, CA (US); Martin Feuerstein, Redmond, WA (US); Scot Douglas Gordon, Redmond, WA (US); Robert Lewis Martin, Antioch, CA (US); David Stevenson Spain, Jr., Portola Valley, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 13/236,048

(22) Filed: Sep. 19, 2011

(65) Prior Publication Data

US 2013/0072230 A1      Mar. 21, 2013

(51) Int. Cl.
   *H04W 24/00*      (2009.01)
   *H04W 4/02*       (2009.01)
   *H04W 4/22*       (2009.01)

(52) U.S. Cl.
   CPC ............... *H04W 4/02* (2013.01); *H04W 4/028* (2013.01); *H04W 4/22* (2013.01)

(58) Field of Classification Search
   CPC ...................................................... H04W 4/02

USPC ................... 455/561.1–561.3, 562
See application file for complete search history.

(56) References Cited

U.S. PATENT DOCUMENTS

| | | | |
|---|---|---|---|
| 2003/0148774 A1* | 8/2003 | Naghian | H04W 64/00 455/456.1 |
| 2006/0030337 A1* | 2/2006 | Nowak | 455/456.2 |
| 2006/0258371 A1* | 11/2006 | Krishnamurthi et al. | 455/456.1 |
| 2007/0026871 A1* | 2/2007 | Wager | 455/456.1 |
| 2007/0270166 A1* | 11/2007 | Hampel et al. | 455/456.3 |
| 2007/0287473 A1* | 12/2007 | Dupray | 455/456.1 |
| 2008/0004038 A1* | 1/2008 | Dunko | 455/456.1 |
| 2008/0119203 A1* | 5/2008 | Shalmon et al. | 455/456.2 |
| 2009/0104917 A1* | 4/2009 | Ben Rached et al. | 455/456.1 |
| 2010/0151882 A1* | 6/2010 | Gillies et al. | 455/456.1 |
| 2010/0173649 A1* | 7/2010 | Ishii | 455/456.2 |
| 2010/0291907 A1* | 11/2010 | MacNaughtan | G06Q 30/0241 455/414.1 |

* cited by examiner

*Primary Examiner* — Justin Lee
(74) *Attorney, Agent, or Firm* — Kaplan Breyer Schwarz & Ottesen LLP

(57) ABSTRACT

An apparatus and method are disclosed for tracking a large number of wireless terminals and for estimating the location of the terminals at each instant. Some embodiments of the present invention use a wide variety of factors to determine the order and frequency with which each wireless terminal is located. These factors include, but are not limited to, the history of the location of the wireless terminal, the time of day, and the weather.

13 Claims, 6 Drawing Sheets

TRACKING LARGE NUMBERS OF WIRELESS TERMINALS

FIELD OF THE INVENTION

The present invention relates to telecommunications in general, and, more particularly, to wireless location systems.

BACKGROUND OF THE INVENTION

FIG. 1 depicts a diagram of the salient components of wireless telecommunications system 100 in accordance with the prior art. Wireless telecommunications system 100 comprises: wireless terminals 101-1, 101-2, 101-3, and 101-4, base stations 102-1, 102-2, and 102-3, radio network controller 111, and wireless switching center 112, interconnected as shown. Wireless telecommunications system 100 provides wireless telecommunications service to all of geographic region 120, in well-known fashion.

The salient advantage of wireless telecommunications over wireline telecommunications is the mobility that is afforded to the users of the wireless telecommunications system. On the other hand, the salient disadvantage of wireless telecommunications lies in that fact that because the wireless terminals are mobile, an interested party might not be able to readily ascertain the location of a terminal.

Such interested parties might include both the user of the wireless terminal and remote parties. There are a variety of reasons why the user of a wireless terminal might be interested in knowing his or her own location. For example, the user might be interested in telling a remote party where he or she is. Or the user might be interested in knowing how to navigate from where he or she is to another location.

There are a variety of reasons why a remote party might be interested in knowing the location of the user. For example, the recipient of a 911 emergency call from a wireless terminal might be interested in knowing the location of the terminal so that emergency services vehicles can be dispatched to that location.

A variety of techniques are known in the prior art for locating a wireless terminal.

In accordance with one technique, a wireless terminal that is engaged in a call is deemed to be at the location of the cell that is handling the call. This technique is advantageous in that it does not require that additional hardware be added to the wireless terminal or to the wireless telecommunications system, and this means that the first technique can be inexpensively implemented in legacy systems. The accuracy of this technique, however, can be quite poor in typically-sized cells, and, therefore, this technique is generally not acceptable for applications (e.g., emergency services dispatch, etc.) that require higher accuracy.

In accordance with a second technique, a wireless terminal is located by triangulating the angle of arrival or the time of arrival of the signals transmitted by the wireless terminal. This technique is accurate to within a few hundreds of meters and is advantageous in that it can be used with legacy wireless terminals. It is disadvantageous, however, in that it generally requires that hardware be added to the telecommunication system's base stations, and this is very expensive.

In accordance with a third technique, a wireless terminal is located by a radio navigation unit, such as a Global Positioning System (GPS) receiver, that is incorporated into the wireless terminal. This technique is accurate to within tens of meters and is advantageous in that it does not require that additional hardware be added to the telecommunication system's infrastructure. Four disadvantages of GPS, however, are that it cannot be used with legacy wireless terminals that do not comprise a radio navigation unit, it often fails to work indoors, it can be easily jammed, and it can be disabled by the user of the terminal.

In accordance with a fourth technique, a wireless terminal is located by pattern-matching location-dependent signal traits measured at the terminal against a database that maps locations to predicted values of the signal traits. This technique can provide excellent accuracy, and also has the advantages of being able to work indoors, and with legacy wireless terminals.

A wireless terminal can be tracked by using any of these techniques repetitively. In general, the confidence with which a tracking system can estimate the location of a wireless terminal at any instant is a function of the frequency at which the location is determined and the mobility of the terminal. This is because the tracking system must estimate the location of the terminal for those instants between when the terminal is actually located. The longer the interval between when the terminal is located, the less confidence the tracking system can have in estimating the location at each instant during the interval. Therefore, the confidence with which a tracking system can estimate the location of a wireless terminal at any instant is a function of the frequency at which the terminal is actually located.

SUMMARY OF THE INVENTION

When a geographic region comprises a large number of wireless terminals, the present invention enables each of the terminals to be tracked without some of the costs and disadvantages for doing so in the prior art. For example, some embodiments of the present invention are able to estimate, with an acceptable degree of confidence, the location of thousands or millions of wireless terminals at each instant.

Repeating a prior art location technique over and over frequently might be practical for tracking one wireless terminal, but it is not practical for tracking a large numbers of terminals. The reason is that the process of locating a wireless terminal consumes limited resources—such as wireline and wireless bandwidth—and those resources are quickly exhausted when the location is re-determined frequently for a large numbers of terminals.

Of course, a prior art location technique can be repeated infrequently for a large number of terminals, but the empirical data would be insufficient to enable a tracking system to estimate, with an acceptable degree of confidence, the location of the terminals at each instant. Many estimates of location would be very wrong. Therefore, a fundamentally different approach is needed to track a large number of terminals.

The inventors of the present invention appreciate that being able to estimate, with an acceptable degree of confidence, the location of large numbers of wireless terminals at each instant does not necessarily require that the location of each terminal be re-determined frequently. Why? Because there are situations in which the location of a wireless terminal can be stated, with an acceptable degree of confidence, even though the location of the terminal is re-determined less frequently.

For example, when the empirical evidence suggests that the wireless terminal is stationary or moving slowly, then the frequency with which the terminal is located can be reduced. As another example, when an embodiment of the present invention observes that a wireless terminal is "home" 99% of the time from Midnight to 6:00 AM, it is reasonable—absent other factors—to locate that wireless terminal infrequently from Midnight to 6:00 AM and yet estimate, with an acceptable degree of confidence, that the terminal is home at each instant between Midnight and 6:00 AM. In contrast, when an embodiment of the present invention observes that a wireless terminal is "home" 11% of the time from Midnight to 6:00 AM, it is not reasonable to locate that wireless terminal infrequently from Midnight to 6:00 AM and yet to estimate that the terminal is at home at each instant between Midnight and 6:00 AM.

Because the resources for ascertaining the location of a wireless terminal are limited, some embodiments of the present invention carefully choose the order and frequency with which each wireless terminal is located. When the embodiments calculate that they can estimate the location of a wireless terminal with an acceptable degree of confidence without locating that terminal frequently, they do so. In contrast, when the embodiments calculate that they cannot estimate the location of a wireless terminal with an acceptable degree of confidence without locating that terminal frequently, they do so. This enables the embodiments to estimate, with an acceptable degree of confidence, the location of large numbers of wireless terminals at each instant without exhausting the available resources.

The illustrative embodiment of the present invention uses a wide variety of factors to determine the order and frequency with which each wireless terminal is located. These factors include, but are not limited to, the history of the location of the wireless terminal, the time of day, and the weather. Additional factors are described below and in the accompanying figures.

The illustrative embodiment comprises: receiving at a first time $t_1$, by a data-processing system, a first datum that is evidence of a first location of a first wireless terminal; receiving at a second time $t_2$, by the data-processing system, a second datum that is evidence of a second location of a second wireless terminal, wherein $t_1$ is before $t_2$; transmitting at a third time $t_3$, by the data-processing system, a first request for evidence of a third location of the first wireless terminal, wherein $t_2$ is before $t_3$; and transmitting at a fourth time $t_4$, by the data-processing system, a second request for evidence of a fourth location of the second wireless terminal, wherein $t_2$ is before $t_4$; and wherein the order in which the first request and the second request are transmitted is decided based on: (i) the proximity of the first location to a first area of interest, and (ii) the proximity of the second location to a second area of interest.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume.

The term "calendrical time" is defined as indicative of one or more of the following:
  (i) a time of day (e.g., 16:23:58, etc.),
  (ii) one or more temporal designations (e.g., Tuesday, November, etc.),
  (iii) one or more temporal events (e.g., Thanksgiving, John's birthday, etc.), and
  (iv) a time span (e.g., 8:00 PM to 9:00 PM, etc.).

Figure 1:
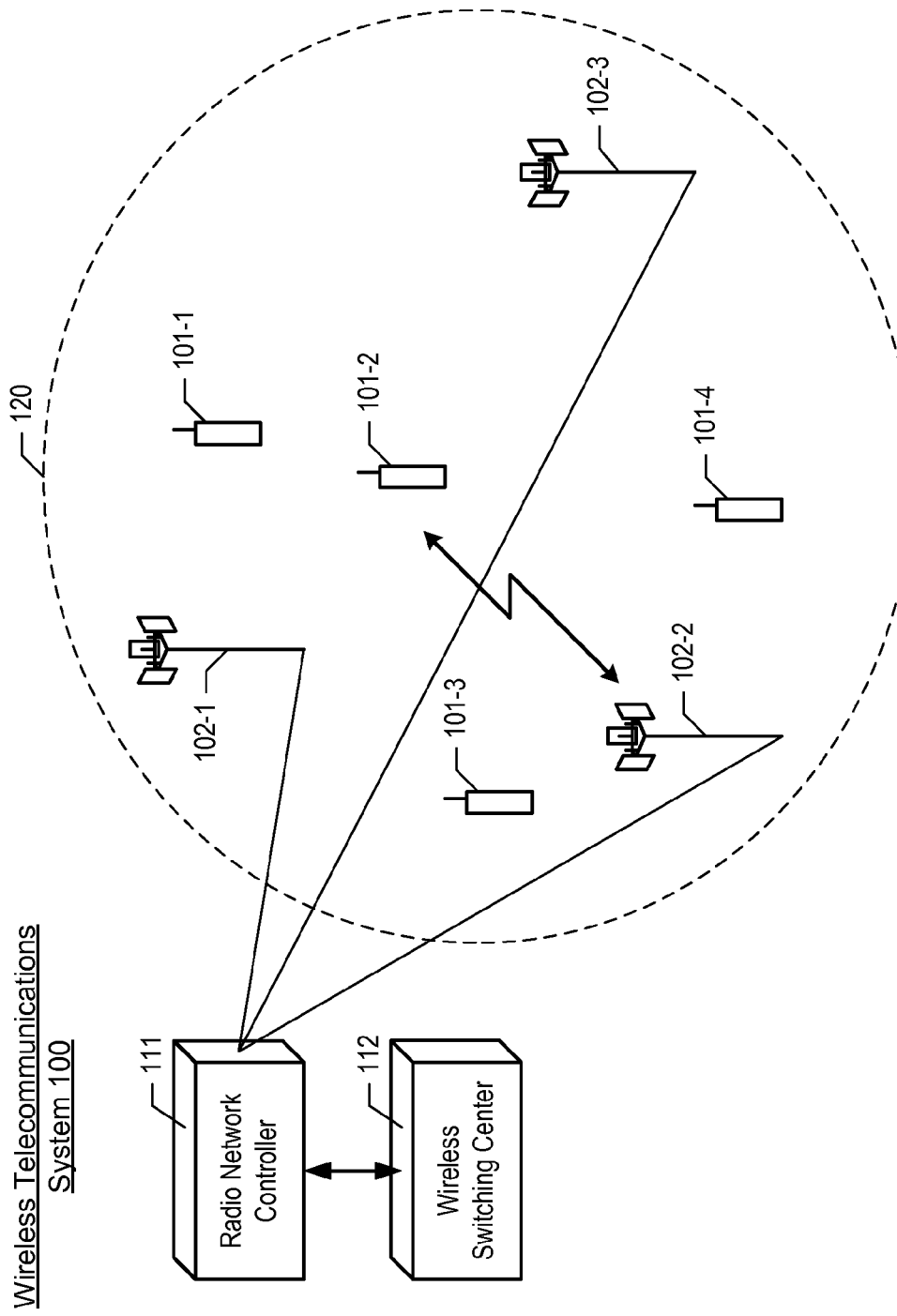
FIG. 1 depicts a diagram of the salient components of wireless telecommunications system 100 in accordance with the prior art.
Figure 2:
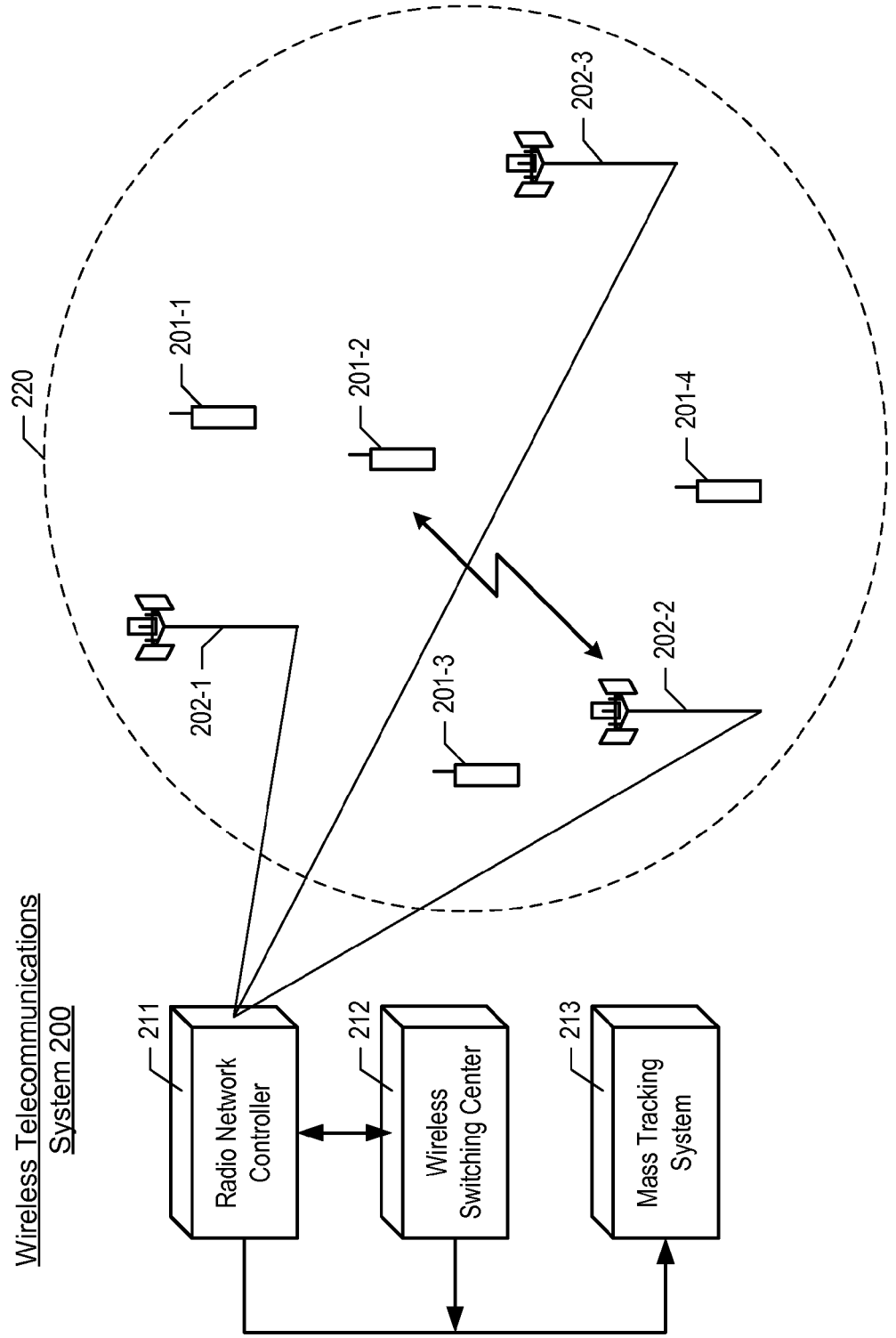
FIG. 2 depicts a schematic diagram of the salient components of wireless telecommunications system 200 in accordance with the illustrative embodiment of the present invention.

FIG. 2 depicts a schematic diagram of the salient components of wireless telecommunications system 200 in accordance with the illustrative embodiment of the present invention. As shown in FIG. 2, wireless telecommunications system 200 comprises wireless terminals 201-1, 201-2, 201-3, 201-4, base stations 202-1, 202-2, and 202-3, radio network controller 211, wireless switching center 212, and mass tracking system system 213, interrelated as shown. Wireless switching center 212 provides telecommunications service to wireless terminals 201-1, 201-2, 201-3, and 201-4, in well-known fashion, and mass tracking system 213 frequently estimates the location of wireless terminals 201-1, 201-2, 201-3, and 201-4 in geographic region 220.

In accordance with the illustrative embodiment, wireless telecommunications service is provided to wireless terminal 201-$i$, wherein i={1, 2, 3, 4} in accordance with the Universal Mobile Telecommunications System, which is commonly known as "UMTS." After reading this disclosure, however, it will be clear to those skilled in the art how to make and use alternative embodiments of the present invention that operate in accordance with one or more other air-interface standards (e.g., Global System Mobile "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201-$i$ comprises the hardware and software necessary to be UMTS-compliant and to perform the functionality described below and in the accompanying figures. For example and without limitation, wireless terminal 201-$i$ is capable of:
  measuring one or more traits (e.g., signal strength, etc.) of one of more electromagnetic signals and of reporting the measurements to wireless switching center 212, and
  transmitting one or more signals and of reporting the transmission parameters of the signals to wireless switching center 212.

Wireless terminal 201-$i$ is mobile and can be at any location within geographic region 220. Although wireless telecommunications system 200 comprises only four wireless terminals, it will be clear to those skilled in the art, after reading this disclosure, how to make and use alternative embodiments of the present invention that comprise any number of wireless terminals. Moreover, as will be appreciated by those skilled in the art, in some embodiments of the present invention wireless terminal 201-$i$ might possess the capability to estimate its location (e.g., with a Global Positioning System (GPS) receiver, with internal software for estimating location, etc.), whereas in some other embodiments wireless terminal 201-$i$ might lack any such capability.

Base stations 202-1, 202-2, and 202-3 communicate with wireless switching center 212 via radio network controller 211 and with wireless terminal 201-$i$ via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, base stations 202-1, 202-2, and 202-3 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

In accordance with the illustrative embodiment, mass tracking system 213 monitors all of the messages that passes between wireless switching center 212, radio network controller 211, and base stations 202-1, 202-2, and 202-3. For example, mass tracking system 213 monitors the Iub interface link, which carries, among other things, messages that indicate:
  (a) the cell ID of the cell serving a wireless terminal that is engaged in a call or responding to a page,
  (b) the round-trip time for messages transmitted between the base station and a wireless terminal and back, and
  (c) the intra-frequency and inter-frequency signal-strength measurements that the wireless terminal reports.

It will be clear to those skilled in the art how to monitor the Iub interface link. In GSM systems, the analog of the Iub interface link is the Abis interface link. Furthermore, it will be clear to those skilled in the art how to record and process all type of information transmitted between a base station and a wireless terminal that are evidence of the location of the terminal.

Wireless switching center 212 comprises a switch that orchestrates the provisioning of telecommunications service to wireless terminal 201-*i* and the flow of information to and from mass tracking system 213, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in locating the wireless terminal. For example, the wireless switching centers can use the IS-41 protocol messages HandoffMeasurementRequest and HandoffMeasurementRequest2 to elicit signal-strength measurements from one another. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201-*i* are associated with wireless switching center 212. It will be clear to those skilled in the art, after reading this disclosure, how to make and use alternative embodiments of the present invention in which any number of base stations are associated with any number of wireless switching centers.

In accordance with the illustrative embodiment, wireless switching center 212 is outside of geographic region 220. It will be clear to those skilled in the art, after reading this disclosure, how to make and use alternative embodiments of the present invention in which some or all of wireless switching center 212 is instead within geographic region 220.

Mass tracking system 213 is a data-processing system comprising hardware and software that is capable of:
  (a) receiving data that is evidence of the location of wireless terminal 201-*i*;
  (b) transmitting maintenance and operational requests to wireless switching center 212 (e.g., LCS Paging Requests, SMS messages, calling the mobile, etc.) to wireless switching center 212; and
  (c) using data that is evidence of the location of wireless terminal 201-*i* to locate wireless terminal 201-*i* in geographic region 220; and
  (d) estimating the location of wireless terminal 201-*i* at every instant.

Mass tracking system 213 is described in detail below and in the accompanying figures.

Figure 3:
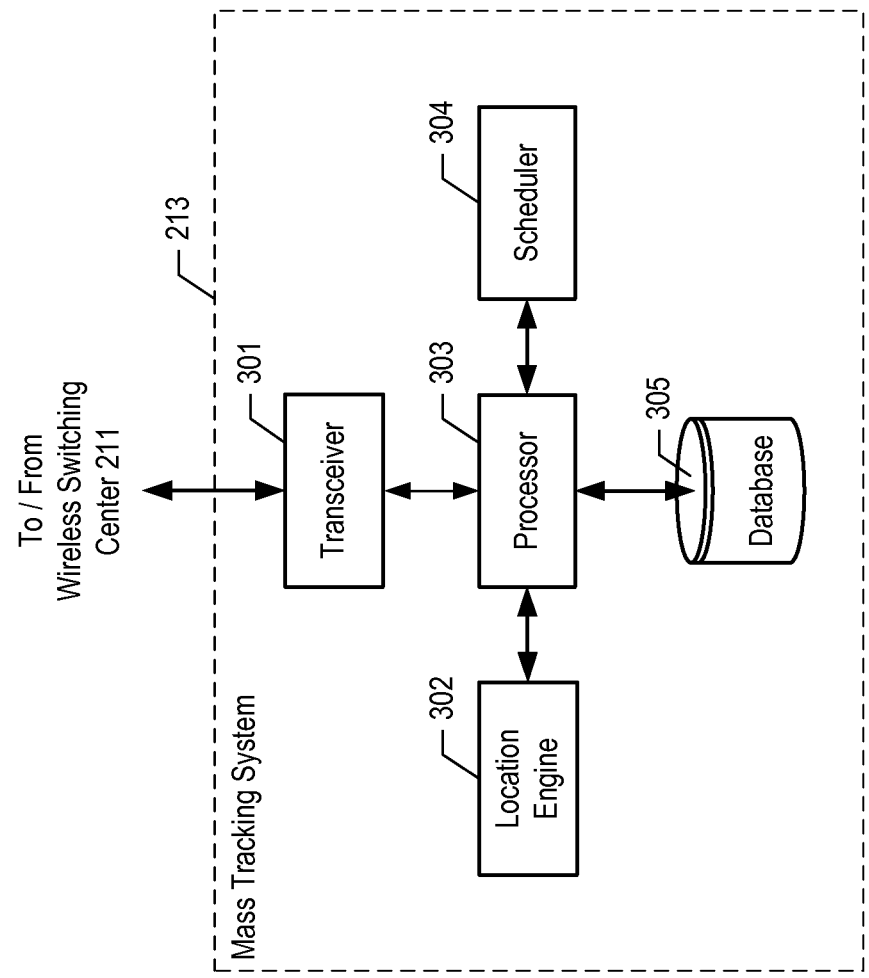
FIG. 3 depicts a block diagram of the salient components of mass tracking system 213, in accordance with the illustrative embodiment.

FIG. 3 depicts a block diagram of the salient components of mass tracking system 213, in accordance with the illustrative embodiment. Mass tracking system 213 comprises: transceiver 301, location engine 302, processor 303, scheduler 304, and database 305.

Transceiver 301 is hardware and software that is capable of transmitting signals to and receiving signals from wireless switching center 212, in well-known fashion. These signals include, but are not limited to, requests for evidence of the location of a wireless terminal, and data that are evidence of the location of a wireless terminal. It will be clear to those skilled in the art how to make and use transceiver 301.

Location engine 302 is hardware and software that is capable of receiving evidence of the location of a wireless terminal (e.g., a serving cell ID, a set of signal-strength measurements that the wireless terminal receives from neighboring cells' base stations, etc.) and determines the location of the wireless terminal. It will be clear to those skilled in the art how to make and use location engine 302. For example, a location engine suitable for use with the present invention is taught in U.S. Pat. No. 7,257,414, which is incorporated by reference.

Processor 303 is hardware and software that is capable of performing the functionality described below and in the accompanying figures. For example, processor 303 is capable of coordinating the movement of data and instructions between transceiver 301, location engine 302, scheduler 304, and database 305, in well-known fashion.

Scheduler 304 is hardware and software that determines the order, timing, and types of requests are transmitted for evidence of the location of each wireless terminal. A request for evidence of the location of a wireless terminal consumes limited and valuable resources, and, therefore, the requests must be rationed and prioritized. Scheduler 304 is responsible for this rationing and prioritizing. The operation of scheduler 304 is described in detail below.

Database 305 is a non-volatile memory that stores the most recent and prior estimates of the locations of wireless terminals 201-1, 201-2, 201-3, and 201-4. As will be appreciated by those skilled in the art, in some embodiments of the present invention database 305 might be a relational database, while in some other embodiments of the present invention, database 305 might be another type of database (e.g., an object-oriented database, a hierarchical database, etc.), while in still other embodiments of the present invention, database 305 might be another type of data store that does not necessarily support the type of query processing typically offered by databases (e.g., an unstructured file, a simple contiguous block of random-access memory, etc.). In any case, it will be clear to those skilled in the art, after reading this disclosure, how to construct, populate, and use database 305.

Figure 4:
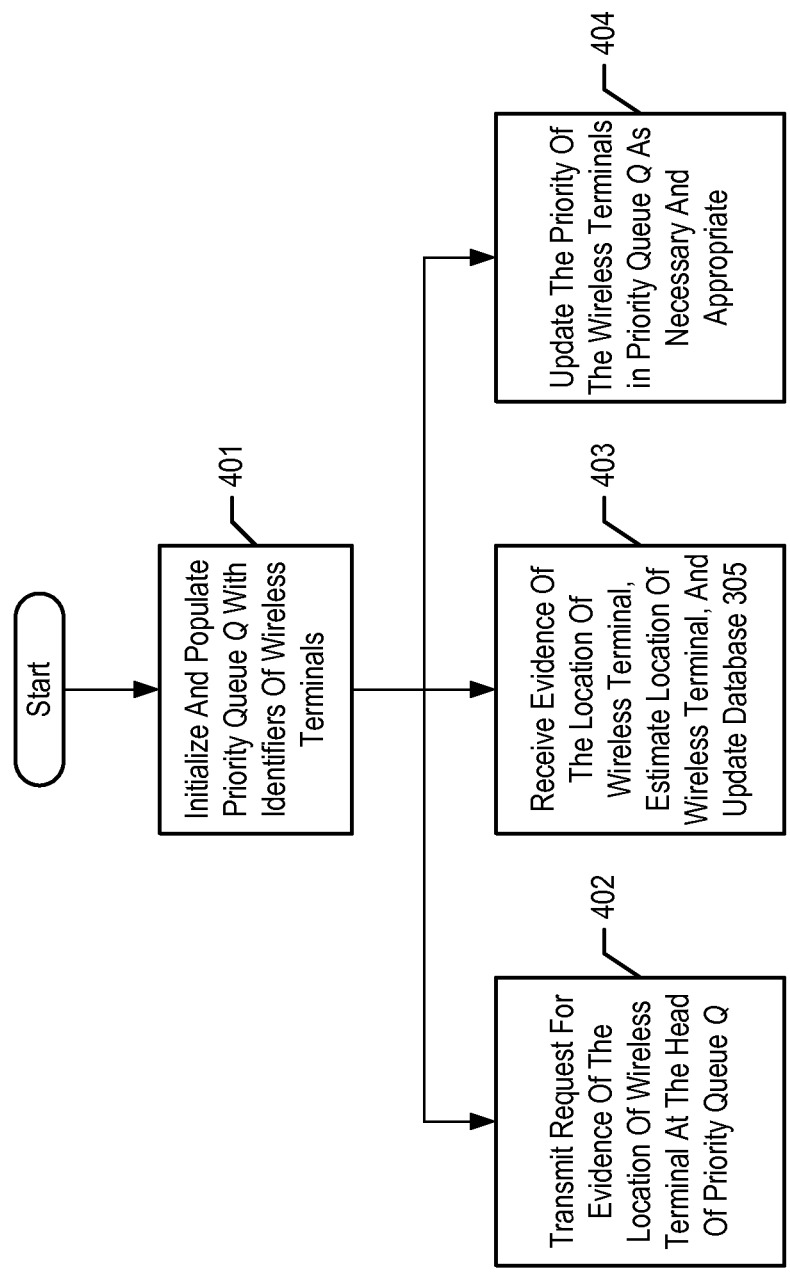
FIG. 4 depicts a flowchart of the salient tasks performed by mass tracking system 213.

FIG. 4 depicts a flowchart of the salient tasks performed by mass tracking system 213. Task 401 is performed first by scheduler 304 and then tasks 402, 403, and 404 are performed frequently and concurrently. It will be clear to those skilled in the art, after reading this disclosure, how to make and use embodiments of the present invention in which the tasks are not performed frequently or concurrently.

At task 401, scheduler 304 initializes and populates priority queue Q with an identifier for wireless terminals 201-1, 201-2, 201-3, and 201-4. Task 401 is described in detail below and in the accompanying figure.

At task 402, processor 303:
(1) queries priority queue Q to learn which of wireless terminals 201-1, 201-2, 201-3, and 201-4 should be the subject of the next request for evidence, and
(2) transmits a request to wireless switching center 212 for evidence of the location of that wireless terminal.

Scheduler 304 is informed when the request has been transmitted and updates priority queue Q accordingly.

In accordance with the illustrative embodiment, the request for evidence of the location of a wireless terminal is an LCS Paging request. This is also called a Location Services Paging request. The LCS Paging request is, in effect, a request for evidence of the location of a wireless terminal because when the paged wireless terminal responds to the page, the response—which is monitored by mass tracking system 213's Iub probe—provides evidence of the wireless terminal's location (e.g., the serving cell's ID, the intra- and inter-frequency measurement reports, etc.). The request for evidence of the location of a wireless terminal can also be an SMS message or a voice call directed to the wireless terminal.

Processor 402 frequently performs task 402 at a rate that takes into consideration the burden that the requests place on the bandwidth of the paging channel and wireless telecommunications system 211's other resources.

At task 403, processor 303 receives a datum that is evidence of the location of a wireless terminal. The datum might be received in response to an LCS Paging request, or, alternatively, it might be received spontaneously and without a request for it. In either case, processor 303 transmits the datum to location engine 302, which determines the location of the wireless terminal based on that datum. In some cases, a highly-accurate estimate (e.g., within 100 meters, etc.) of the location of the wireless terminal is desired and, in those cases, location engine 302 will generate a highly-accurate estimate. In some cases, a less-accurate estimate (e.g., the reported Cell-ID of a recent serving Cell, etc.) of the location of the wireless terminal is acceptable and, in those cases, location engine 302 will generate that estimate. Location engine 302 then transmits the estimate of the location of the wireless terminal back to processor 303, which stores it in database 305 for later analysis.

At task 404, scheduler 304 updates the priority of the wireless terminals in priority queue Q, as necessary and appropriate. As the priority of each wireless terminal in priority queue Q is updated, the order in which mass tracking system 213 requests evidence of the location of the wireless terminal changes. The priority for wireless terminal T in priority queue Q is updated (i.e., increased, decreased, or left unchanged) whenever:
(a) a new estimate of the location of wireless terminal T is made;
(b) there is a change in the status of the person P, who is associated with wireless terminal T (e.g., Person P becomes identified as or predicted to be a criminal, a college student, a person with a pilot's license, a person who has access to explosives, a politician, a U.S. citizen, a foreign national, etc.);
(c) the calendrical time crosses a threshold (e.g., changes from day to night, changes from a weekday to a weekend, etc.);
(d) the weather at a location associated with wireless terminal T changes (e.g., it changes from rain to snow, etc.);
(e) a man-made event of concern (e.g., a riot, a bomb blast, etc.) occurs at or near a location associated with wireless terminal T;
(f) a natural event of concern (e.g., an earthquake, a tornado, a tsunami, etc.) occurs at or near a location associated with wireless terminal T;
(g) the "social network proximity" of person P to a person of interest changes (e.g., the person P becomes a "friend" of a person of interest on Facebook or Linked-in, etc.);
(h) whether the need for an estimate of the location of wireless terminal T changes; and
(i) the wireless terminal T re-registers with wireless telecommunications network 200.

The updated priority of wireless terminal T is generated based on one or more of the following:
(a) the calendrical time of an event associated with wireless terminal T, wireless switching center 212, or mass tracking system 213;
(b) the proximity of a location associated with wireless terminal T to an "area of interest." For example, and without limitation:
  a. a building complex (e.g., a military facility, a nuclear facility, a mass transit facility, a government office, a hotel, etc.);
  b. a man-made event of concern in geographic region 220 (e.g., a riot, a bomb blast, etc.);
  c. a natural event of concern in geographic region 220 (e.g., an earthquake, a tornado, a tsunami, etc.);
(c) a measure of the proximity of a location associated with wireless terminal T to a location associated with another wireless terminal V. For example, and without limitation:
  a. the distance between a location associated with wireless terminal T and a location associated with wireless terminal V;
  b. the direction of movement from a location associated with wireless terminal T to a location associated with wireless terminal V;
  c. the speed of movement from a location associated with wireless terminal T to a location associated with wireless terminal V;
(d) the weather at a location associated with wireless terminal T or in geographic region 220;
(e) a measure of the mobility of wireless terminal T. For example, and without limitation:
  a. the distance between two locations associated with wireless terminal T;
  b. the direction of movement from one location associated with wireless terminal T to another location associated with wireless terminal T;
  c. the speed of movement from one location associated with wireless terminal T to another location associated with wireless terminal T;
(f) one or more events, or the lack thereof, involving wireless terminal T (e.g., wireless terminal T attaching to wireless telecommunications system 200 for the first time, a Location Area Update from wireless terminal T, a timer-based update from wireless terminal T, a call placed by wireless terminal T, a call received by wireless terminal T, a data session involving wireless terminal T, a short message service [SMS] message sent or received by wireless terminal T, etc.);

(g) whether the person P, who is associated with wireless terminal T, is a "person of interest";

(h) the "social network proximity" of person P to a person of interest (e.g., person P is a second-degree connection to a person of interest in a social network, etc.);

(i) whether wireless terminal T is a domestic or foreign terminal (e.g., is the "home" of the wireless terminal in the United States, is the home of the wireless terminal in Yemen, etc.);

(j) a measure of staleness of the prior location estimate for wireless terminal T;

(k) a measure of latency of the last known location of wireless terminal T; and (l) the size of priority queue Q;

(m) the average wait time for priority queue Q;

(n) the available computational resources of wireless location system 213 for determining the location of wireless terminal T;

(o) one or more network parameters of wireless telecommunications system 200 (e.g., the current network load, the average network load over a particular time interval, etc.);

(p) one or more events, or the lack thereof, in wireless telecommunications system 200 (e.g., a failure, maintenance, etc.); and (q) criteria (both statistical and non-statistical) pertaining to the entire population of wireless terminals in geographic region 220 (e.g., at least 80% of all terminals are located every hour, all terminals are guaranteed to be located at least once in any 3-hour period, etc.).

Figure 5:
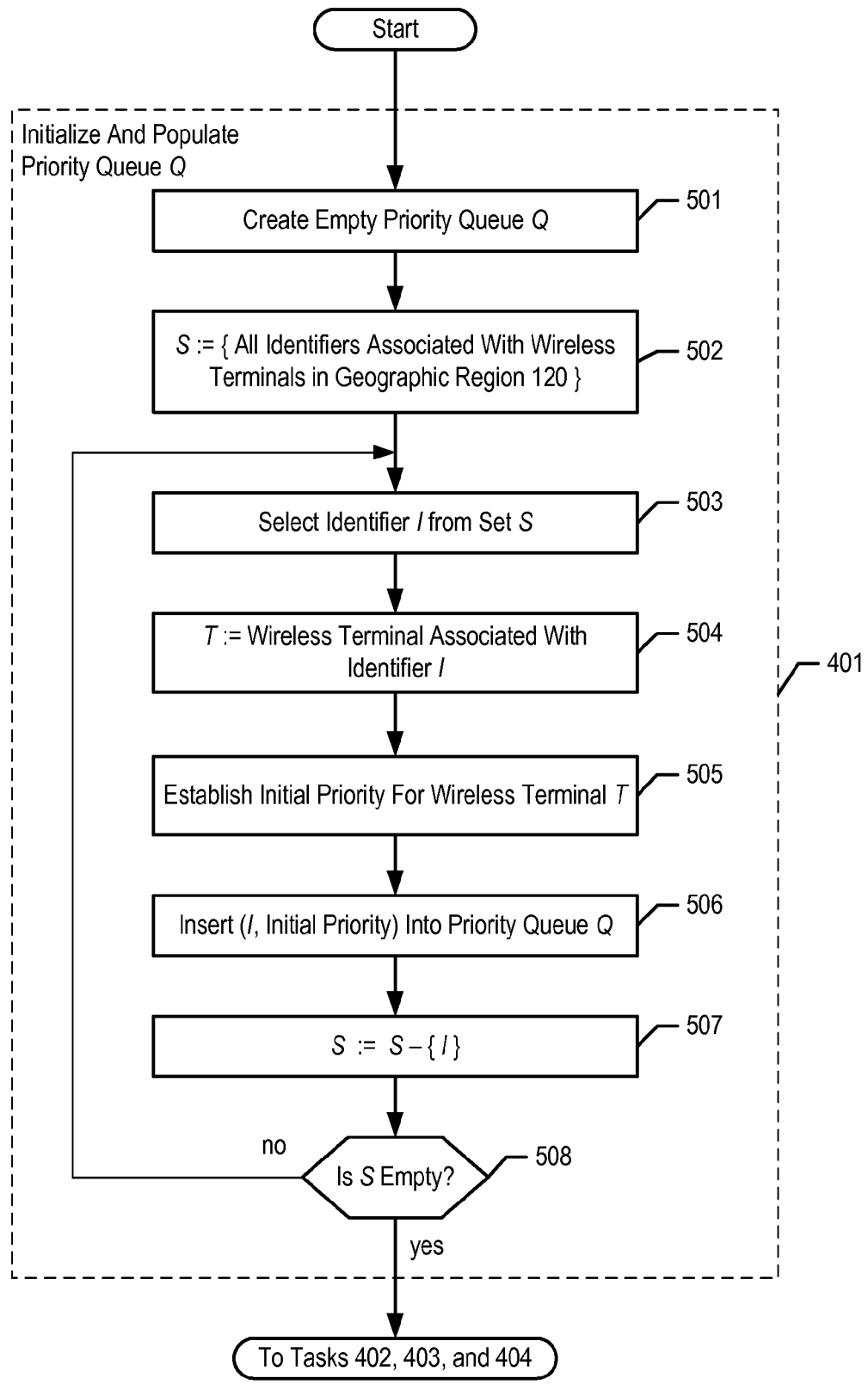
FIG. 5 depicts a detailed flowchart of task 401, in accordance with the illustrative embodiment of the present invention.

FIG. 5 depicts a detailed flowchart of task 401, in accordance with the illustrative embodiment of the present invention. It will be clear to those skilled in the art, after reading this disclosure, which subtasks depicted in FIG. 5 can be performed simultaneously or in a different order than that depicted.

At subtask 501, an empty priority queue Q is created. As will be appreciated by those skilled in the art, there are a variety of data structures that enable efficient usage and manipulation of priority queues (e.g., heaps providing logarithmic-time operations, etc.), and it will be clear to those skilled in the art, after reading this disclosure, how to make and use embodiments of the present invention that employ such data structures.

At subtask 502, variable S is initialized to the set of all identifiers associated with wireless terminals in geographic region 220. As will be appreciated by those skilled in the art, in some embodiments of the present invention, the set of identifiers might be ascertained via a query from scheduler 304 to wireless switching center 212, while in some other embodiments, the set of identifiers might be ascertained in some other fashion (e.g., via a lookup of database 305, etc.).

At subtask 503, scheduler 304 selects an identifier I from set S.

At subtask 504, variable T is set to the wireless terminal associated with identifier I.

At subtask 505, scheduler 304 establishes an initial priority for wireless terminal T, based on one or more of the following:

(a) the calendrical time at geographic region 220 (e.g., whether it is nighttime, daytime, a weekday, a holiday, a weekend, Sunday morning, etc.);

(b) the weather in geographic region 220 (e.g., whether it is raining, sunny, foggy, snowing, cold, hot, etc.);

(c) a man-made event of concern in geographic region 220 (e.g., a riot, a bomb blast, etc.);

(d) a natural event of concern in geographic region 220 (e.g., an earthquake, a tornado, a tsunami, etc.);

(e) a measure of interest in wireless terminal T and/or the person P who is associated with wireless terminal T (e.g., Person P is a scientist, a criminal, a college student, a person with a pilot's license, a person who has access to explosives, a politician, a U.S. citizen, a foreign national, etc.);

(f) whether wireless terminal T is a domestic or foreign terminal (e.g., is the "home" of the wireless terminal in the United States, is the home of the wireless terminal in Yemen, etc.);

(g) the "social network proximity" of person P to one or more persons of interest (e.g., is the person P a "friend" of a person of interest on Facebook or Linked-in, etc.);

(h) whether a highly-accurate estimate of the location of wireless terminal T is desired; and (i) how urgently and frequently a highly-accurate estimate of the location of wireless terminal T is desired.

At subtask 506, scheduler 304 inserts an item into priority queue Q that comprises identifier I and its associated initial priority.

At subtask 507, scheduler 214 removes identifier I from set S.

At subtask 508, scheduler 214 checks whether set S is empty; if not, execution continues back at subtask 503, otherwise execution proceeds to subtasks 402, 402, and 404 of FIG. 4.

Figure 6:
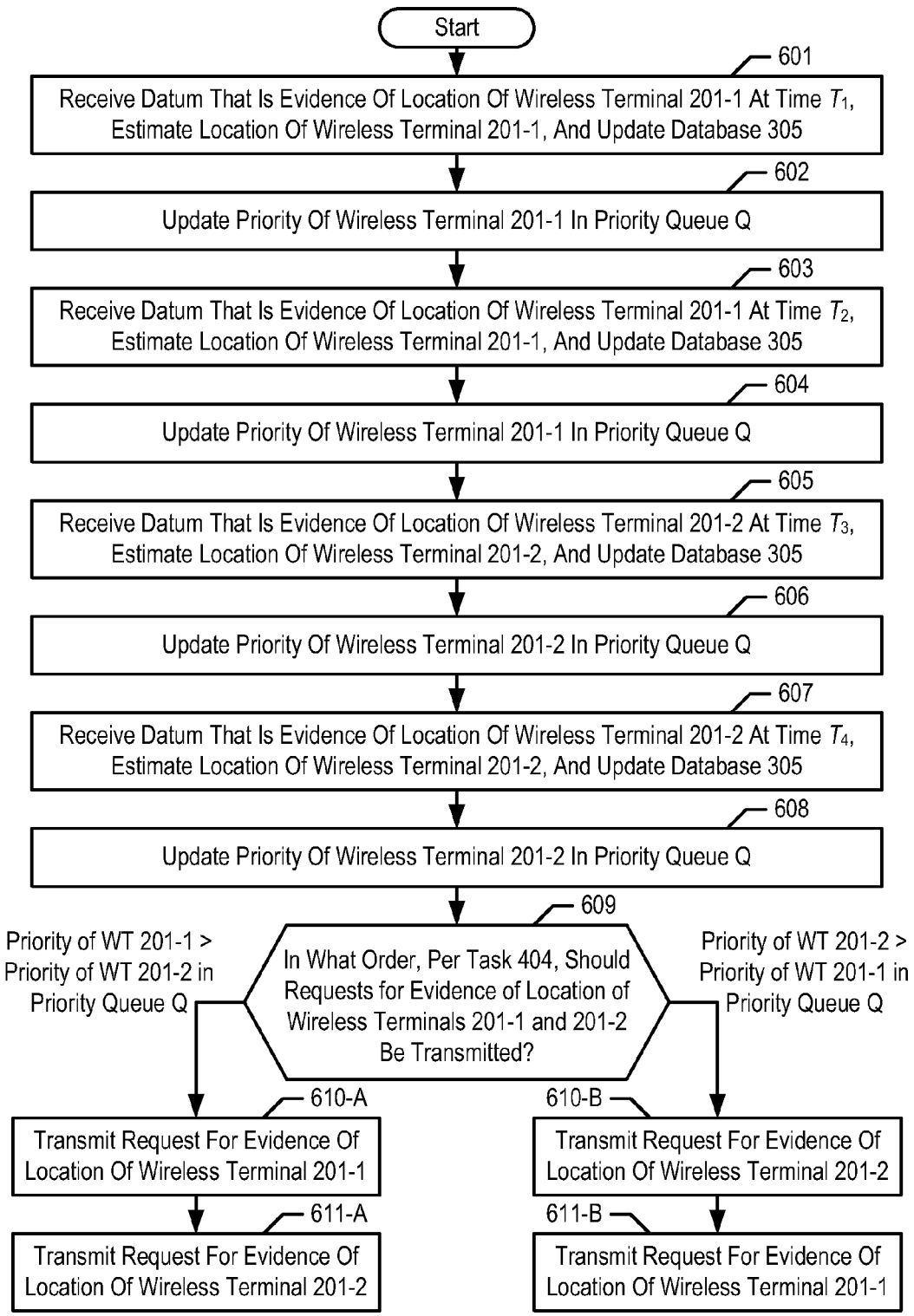
FIG. 6 depicts a flowchart of a simple series of events in the operation of the illustrative embodiment involving only wireless terminals 201-1 and 201-2.

FIG. 6 depicts a flowchart of a simple series of events in the operation of the illustrative embodiment involving only wireless terminals 201-1 and 201-2. The sequencing of events depicted in FIG. 6 is intended for teaching purposes only. It will be clear to those skilled in the art, after reading this disclosure, that in some embodiments of the present invention, some of the events depicted in FIG. 6 are performed concurrently.

At event 601, processor 303 in mass tracking system 213 receives a datum that is evidence of the location of wireless terminal 201-1 at time $t_1$. Location engine 302 determines the location of wireless terminal based on the datum, and updates database 305 accordingly. Event 601 is an example of the execution of task 403. Event 601 might have occurred spontaneously or in response to a request for evidence of the location of wireless terminal 201-1 (which is not shown in FIG. 6).

At event 602, scheduler 304 updates the priority of wireless terminal 201-1 in priority queue Q because of event 601. Event 602 is an example of the execution of task 404.

At event 603, processor 303 in mass tracking system 213 receives a datum that is evidence of the location of wireless terminal 201-1 at time $t_2$. Location engine 302 determines the location of wireless terminal based on the datum, and updates database 305 accordingly. Event 603 is another example of the execution of task 403. Event 603 might have occurred spontaneously or in response to a request for evidence of the location of wireless terminal 201-1 (which is not shown in FIG. 6).

At event 604, scheduler 304 updates the priority of wireless terminal 201-1 in priority queue Q because of event 603. Event 604 is another example of the execution of task 404.

At event 605, processor 303 in mass tracking system 213 receives a datum that is evidence of the location of wireless terminal 201-2 at time $t_3$. Location engine 302 determines the location of wireless terminal based on the datum, and updates database 305 accordingly. Event 605 is another example of the execution of task 403. Event 605 might have occurred spontaneously or in response to a request for evidence of the location of wireless terminal 201-2 (which is not shown in FIG. 6).

At event 606, scheduler 304 updates the priority of wireless terminal 201-2 in priority queue Q because of event 605. Event 606 is another example of the execution of task 404.

At event 607, processor 303 in mass tracking system 213 receives a datum that is evidence of the location of wireless terminal 201-2 at time $t_4$. Location engine 302 determines the location of wireless terminal based on the datum, and updates database 305 accordingly. Event 607 is another example of the execution of task 403. Event 607 might have occurred spontaneously or in response to a request for evidence of the location of wireless terminal 201-2 (which is not shown in FIG. 6).

At event 608, scheduler 304 updates the priority of wireless terminal 201-2 in priority queue Q because of event 607. Event 608 is another example of the execution of task 404.

At event 609, processor 303 prepares to transmit requests for evidence of the location of both wireless terminal 201-1 and 201-2. But in which order should the requests be transmitted? The basis for answering this question is determined by the relative priorities of wireless terminal 201-1 and 201-2 in priority queue Q, which is, of course, determined by the factors listed in task 404, as described above. Depending on the answer, the request for evidence of the location of wireless terminal 201-1 is transmitted before the request for evidence of the location of wireless terminal 201-2, as depicted in events 610-A and 611-A, or in the reverse order, as depicted in events 610-B and 611-B. The intelligent application of the factors described in task 404 enable the requests for evidence to be transmitted in an order that prevents the exhaustion of limited resources and yet enables the illustrative embodiment to estimate, with an acceptable degree of confidence, the location of the wireless terminals at each instant.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
   a scheduler that is configured to:
   (a) update a priority queue that comprises a priority for each of a plurality of wireless terminals, wherein the scheduler is configured to update the priority queue based on a plurality of factors comprising:
      (i) the time of day,
      (ii) the weather,
      (iii) whether the first wireless terminal is stationary, and
      (iv) whether the first wireless terminal is moving slowly; and
   (b) determine, based on the priority of a first wireless terminal in the priority queue, a timing of a request to be transmitted for evidence of a location of the first wireless terminal; and
   a processor that is configured to:
   (a) transmit, based on the timing determined by the scheduler, the request for evidence of the location of the first wireless terminal, to a wireless switching center that orchestrates the provisioning of telecommunications service to the first wireless terminal, such that the first wireless terminal responds by providing signal-strength measurements, and
   (b) receive, from a location engine, the location of the first wireless terminal as determined based on the signal-strength measurements;
   wherein at every instant the system comprises an estimated location of each wireless terminal in the plurality, including the location of the first wireless terminal.

2. The system of claim 1 wherein the processor is further configured to transmit a plurality of requests for evidence of location of the first wireless terminal with a frequency that is based at least in part on one or more of:
   (i) a history of locations for the first wireless terminal,
   (ii) the time of day, and
   (iii) the weather;
   and further wherein the frequency is based on the timing determined by the scheduler.

3. The system of claim 1 wherein the plurality of factors further comprises:
   (v) a history of locations for the first wireless terminal.

4. The system of claim 1 wherein the processor is further configured to transmit a plurality of requests for evidence of location of the first wireless terminal with a frequency that is reduced when the first wireless terminal is one of (i) stationary, and (ii) moving slowly.

5. The system of claim 1 wherein the system is a mass tracking system in a wireless telecommunications system.

6. The system of claim 1 wherein the processor is further configured to estimate, with the degree of confidence that is acceptable, the respective locations of a plurality of wireless terminals, wherein the priority queue comprises a priority for each wireless terminal in the plurality.

7. The system of claim 1 wherein the request for evidence of the location of the first wireless terminal is a location services (LCS) paging request.

8. A system comprising:
   a scheduler that is configured to:
   (i) determine, based on a priority queue, at least one of an order of and a timing of a request to be transmitted for evidence of location of a first wireless terminal, wherein the priority queue comprises a priority for each of a plurality of wireless terminals comprising the first wireless terminal, and
   (ii) update the priority queue based on a plurality of factors comprising:
      (a) the time of day,
      (b) the weather,
      (c) whether the first wireless terminal is stationary, and
      (d) whether the first wireless terminal is moving slowly; and
   a processor that is configured to:
   (i) receive a first datum that is evidence of a first location of the first wireless terminal, and
   (ii) calculate, after the first datum is received, whether the system can estimate, based on the first datum, a second location of the first wireless terminal with a degree of confidence that is acceptable, and
   (iii) based on the priority queue, when the degree of confidence is not acceptable, transmit the request for evidence of the second location of the first wireless terminal as determined by the scheduler, to a wireless switching center that orchestrates the provisioning of telecommunications service to the first wireless terminal, such that the first wireless terminal responds by providing signal-strength measurements, and
   (iv) based on the priority queue, when the degree of confidence is acceptable, refrain from transmitting the request.

9. The system of claim 8 wherein the system is a mass tracking system in a wireless telecommunications system.

10. The system of claim 8 wherein the processor is further configured to estimate, with the degree of confidence that is acceptable, the respective locations of a plurality of wireless terminals.

11. The system of claim 8 wherein the plurality of factors further comprises:
   (e) a history of locations for the first wireless terminal.

12. The system of claim 8 wherein the processor is further configured to transmit a plurality of requests for evidence of location of the first wireless terminal with a frequency that is reduced when the first wireless terminal is one of (i) stationary, and (ii) moving slowly.

13. The system of claim 8 wherein the request for evidence of the location of the first wireless terminal is a location services (LCS) paging request.

* * * * *